UNITED STATES PATENT OFFICE.

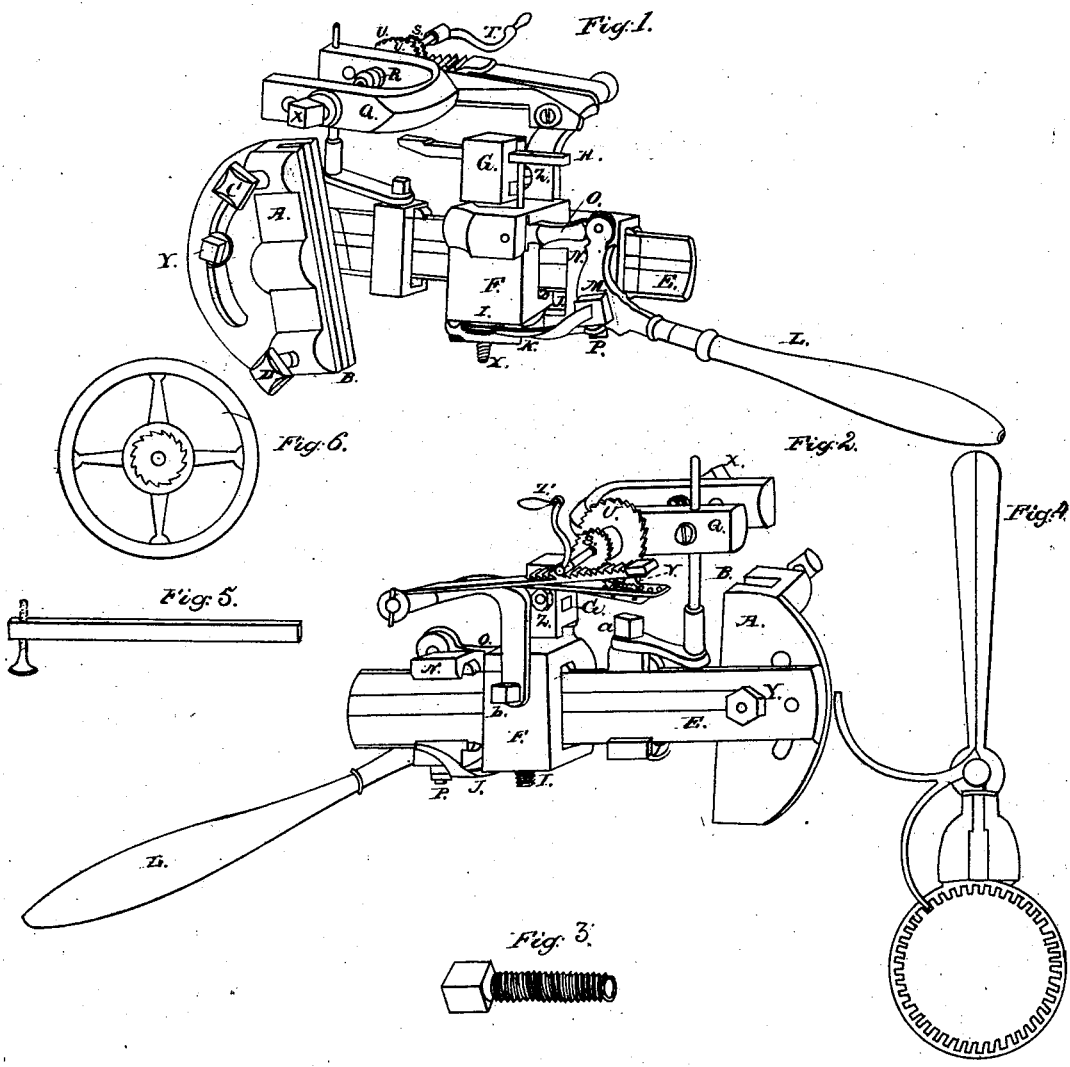
P. Maltby,
Sharpening Reciprocating Saws.
Nº 18,017. Patented Aug. 18, 1857.

PHILO MALTBY, OF DAYTON, OHIO.

MACHINE FOR DRESSING SAWS.

Specification of Letters Patent No. 18,017, dated August 18, 1857.

*To all whom it may concern:*

Be it known that I, PHILO MALTBY, of Dayton, in the county of Montgomery and State of Ohio, have invented a new and useful Machine for Dressing Saws; and I do hereby declare that the same is described and represented in the following specifications and drawings.

To enable others skilled in the art to make and use my invention, I will proceed to describe its construction and operation, referring to the drawings, in which the same letters indicate like parts in each of the figures.

Figures 1 and 2 are perspective views of the opposite side of my machine for dressing saws. The other figures represent parts in detail which will be referred to in the description.

The nature of my invention consists in a clamp for holding the plate of the saw in combination with devices for holding, operating, and feeding a tool to plane the teeth of the saw to sharpen them. And in arranging a drilling apparatus to drill holes in the saw plate, so as to be operated by motion or power derived or communicated from the planing apparatus, so as to turn and feed the drill, at the same time that the teeth are planed.

In the accompanying drawings A, is a block of metal made in the form shown in the drawing or of such other form as will answer the purpose, provided with a groove B to receive the back edge of the saw plate, and two screws C, and D, to press the movable plate D' shown in dotted lines against the saw plate, so as to clamp and hold it firmly while it is operated upon as will be hereafter described. The bar E which has its edges beveled in each direction is fastened to the block A, by the bolts Y, Y', the latter bolt being arranged to traverse in the curved slot $Y^2$, so as to adjust the bar E, at the angle desired, and fasten it by tightening the bolts.

F, is a metal carriage arranged to traverse on the bar E, and provided with seats c, c, fitted to the beveled edges of the bar E which may be tightened upon the bar by set screws in the bottom of the carriage.

The tool post G, is fitted to traverse through the carriage F, at right angles to the bar E, and in the same plane with the groove B, its upper end is made double and provided with scores for the planing tool H, and gage bar H' shown in Fig. 5, both of which may be adjusted in the scores and clamped fast by turning the nut z, Fig. 2, which draws the two parts of the tool post together. The tool H, is used to plane the edges of the saw teeth into the form desired by traversing the carriage F, on the bar E, which is effected by vibrating the lever L, on the stud M, the arm L', of the lever, being connected to the carriage F, by the link O, as shown in Fig. 1. The stud M is fastened to the block N, which is fitted to the bar E, so that it may be adjusted to the proper place on the bar and fastened by the screw P, Fig. 2. The lower end of the tool post G is a male screw I, to which the female screw in the toothed nut I' is fitted, and the nut is held against the bottom of the carriage by the cap e, fastened to the carriage, and turned so as to feed the post and tool upward by the pawl K, which vibrates on the screw P' (Fig. 1,) in the stud M, and the spring f, is fastened to the same stud to press the pawl against the nut and turn it when the carriage is drawn back by raising the lever L. The toothed nut I is turned in the opposite direction, so as to feed the tool H, downward, by the pawl J, (Fig. 2,) which vibrates on the screw P, and is pressed against the nut I, by the spring g, fastened to the block N. Only one of the pawls should be allowed to come in contact with the toothed nut at a time, and the other may be pressed off by a piece of wood, or in some other convenient manner.

The tool H, is shown in a proper position to plane the under edges of the saw teeth, and the gage bar H' is arranged below it, and the screw h, in the bar, may be set, so as to come in contact with the next tooth below the one being planed, when it is planed enough so as to make the spaces between the saw teeth of a uniform length.

The block N may be moved to adopt the machine to saws of different widths, and this machine can be applied to and operated upon the saw while the saw is in the frame or sash, thereby saving the trouble of removing the saw to either gum or sharpen it.

The block R is fitted to the bar E to hold the stand R', fastened to it by the screws a, which stand supports the bow Q, which may be adjusted upon it and fastened by the set screw d, Fig. 2. The male screw U, is fitted to turn in one arm of the bow Q to feed the drill $R^2$ which passes through the screw U, and has a shoulder upon it for the end of the screw to act against when it is turned to feed the drill by pawl V, Fig. 2, which acts on the ratchet wheel U′, fastened to the screw U, as shown in the drawings. The pawl V is fitted into the bar W, which is fastened to the stand W′, on the carriage F, so as to be traversed by the carriage to turn the screw U and feed the drill when the carriage is traversed to plane a tooth of the saw. The pawl V, is pressed against the wheel U′ by the spring V′, fastened to the under side of the bar W. The stand W′ is fastened to the carriage F, by the screw $b$, and the pawl S, vibrates on its outer end and is pressed by the spring $i$, on the stand W′, shown by dotted lines in Fig. 1, against the wheel S′, fastened to the drill R², so as to turn the drill, and drill a hole in the plate of the saw to gum it, at the same time that the carriage is traversed to plane a tooth, the drill boring the hole opposite one of the spaces above that in which the planing tool is working. The screw X is fitted to turn in the bow Q, right opposite to the drill R², to hold the saw plate against the drill, and there is a hole bored in the end of the screw X, Fig. 3, for the point of the drill to enter as it passes through the saw.

If it is desired to operate the drill without traversing the carriage it may be turned by the crank T, or the pawls S, and V, with the stand W′ may be removed; and the wheel, Fig. 4, applied to the screw U, and the lever and pawl, Fig. 6, to the drill R², so as to operate both the drill and feeding screw by hand.

When the under edges of the teeth have been planed the drilling apparatus may be removed by taking out the screw $a$, and the block or clamp A, reversed or turned the other end up on the saw, and the bar E, changed so as to stand parallel with the upper edges of the teeth of the saw, so as to plane off the upper edges of the teeth by traversing the carriage.

If it is desirable to make the edges of the teeth rounding, hollow or beveled either way the form of the tool H, may be varied to adapt it to the shape required. By making a long clamp in a proper form and substituting it for the block A, this machine may be applied to circular saws so as to gum and sharpen them without taking them off of their shafts.

My machine can be worked very expeditiously so as to dress and sharpen a saw in far less time and with far less labor than by filing or any other process heretofore known besides the cost of the files is saved.

I believe I have described and represented my invention for dressing saws, so as to enable any person skilled in the art to make and use it.

I will now state what I desire to secure by Letters Patent, to wit:

1. I claim the above described devices or their equivalents for clamping and holding the plate of the saw, in combination with the devices or their equivalents for holding, operating and feeding the tool to plane the teeth of the saw substantially as described.

2. And in combination with the above claimed devices or their equivalents for holding the plate and planing the teeth of the saw, I claim the above described apparatus, or its equivalent, for operating and feeding the drill, by power or motion derived or communicated from the planing apparatus, so as to drill the holes in the plate at the same time the teeth are planed.

PHILO MALTBY.

Witnesses:
ROBT. TORRENCE,
C. W. GRIFFITH.